(12) United States Patent
Li et al.

(10) Patent No.: US 7,401,330 B2
(45) Date of Patent: Jul. 15, 2008

(54) CLONING PROGRAMMING CODE

(75) Inventors: David Xinliang Li, Sunnyvale, CA (US); Robert Hundt, Santa Clara, CA (US); Sungdo Moon, Cupertino, CA (US); Loreena Wong, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 10/734,551

(22) Filed: Dec. 11, 2003

(65) Prior Publication Data

US 2005/0144606 A1    Jun. 30, 2005

(51) Int. Cl.
*G06F 9/44*    (2006.01)
(52) U.S. Cl. .................... 717/162; 717/151; 719/331
(58) Field of Classification Search ................. 717/154, 717/159
See application file for complete search history.

(56) References Cited

U.S. PATENT DOCUMENTS

| | | | | |
|---|---|---|---|---|
| 5,303,376 A | * | 4/1994 | Taki ........................... | 717/162 |
| 5,812,855 A | * | 9/1998 | Hiranandani et al. ........ | 717/157 |
| 5,850,554 A | * | 12/1998 | Carver ......................... | 717/162 |
| 5,920,721 A | * | 7/1999 | Hunter et al. ................ | 717/159 |
| 5,983,021 A | * | 11/1999 | Mitrovic ...................... | 717/158 |
| 6,202,205 B1 | * | 3/2001 | Saboff et al. ................. | 717/151 |
| 6,895,580 B2 | * | 5/2005 | Bates et al. .................. | 717/157 |
| 7,058,561 B1 | * | 6/2006 | Kumar ......................... | 703/22 |
| 7,065,754 B1 | * | 6/2006 | Coutant et al. .............. | 717/146 |
| 7,086,044 B2 | * | 8/2006 | Hanson et al. .............. | 717/151 |
| 2003/0079215 A1 | * | 4/2003 | Hundt et al. ................ | 717/164 |

* cited by examiner

*Primary Examiner*—Tuan Q. Dam
*Assistant Examiner*—Michael J Yigdall

(57) ABSTRACT

Techniques for cloning programming code are disclosed. In an embodiment, the cloned code is in the form of functions in the C language. Further, in a method embodiment, a clone of a function is invoked, and information mapping the clone to the function is generated. At link time, if no function body of the clone is accessible by a linker, then the linker uses information mapping the clone to the function to satisfy a linker's requirement. At load time, if no function body of the clone is accessible by a loader, then the loader, based on the mapping information, allows selection of a body of the function. However, if the body function of the clone is accessible by the loader, then the loader allows selection of the body of the clone.

26 Claims, 7 Drawing Sheets

```
bar(int p) {
    if (p==0) {
310
    ...
320
    } else {
330
    ...
340
    }
}
```

```
bar_clone_1(int p) {
    if (p==0) {
310
    ...
320
    }
}
```

```
bar_clone_2(int p) {
    if (p!=0) {
330
    ...
340
    }
}
```

FIG. 3

```
pragma clone bar no_parms_overlap int bar(int* p, int* q) {

410A    for (...){
         *q++ = ...
          ... = *p++;
420A    }
}
```

FIG. 4A

```
pragma clone bar parm_align(1)=16, parm_align(2)=16 int bar(char* p, char* q) {

410B    for (i=0; I <n; i++ ){
         *q++ = *p++;
420B    }
}
```

FIG. 4B

```
pragma clone bar parm_value(2)=1 int bar(int p, int q) {

```
#pragma clone bar parm_value(1) > parm_value(2)

int bar(int p, int q) {

<clone>_<original_function_name>_<condition_1>_..._<condition_n>

CLONING PROGRAMMING CODE

FIELD OF THE INVENTION

The present invention relates generally to computer programs and, more specifically, to cloning programming code.

BACKGROUND OF THE INVENTION

Cloning programming code refers to creating various versions of the code, usually in the form of a function, to optimize the function's performance. Generally, one or more versions of a function are created or "cloned" from the function, and each cloned version performs better if a condition is satisfied. During program execution, if the condition corresponding to a cloned function is met, that cloned function, instead of the original function, is invoked, and the program therefore executes better because it runs a better version of the function.

Currently, to identify cloning candidates, the compiler needs to identify the callers and their relevant information, such as context information, values, properties, etc., of the argument, global variables, etc. The compiler also needs to identify the definition or the function body including the programming code of the function to be called (e.g., the callee) so that the compiler can perform analysis to determine the cloning benefits, strategies, etc. The compiler further needs to process the source code of the program and related libraries at the same time.

Additionally, independent cloning for shared libraries that contain functions including their cloned versions cannot be done because when a shared library is built independently from other routines of a program, information related to the calls, the callers, etc., is not available. However, when the program applications invoking the cloned functions are built, information of the callers is available, but the source code of the library may not be available for modification. Building a library or a program refers to creating binary programming code from its source code, including compiling and linking various objects, object modules, etc.

Based on the foregoing, it is desirable that mechanisms be provided to solve the above deficiencies and related problems.

SUMMARY OF THE INVENTION

The present invention relates to cloning programming code, which, in an embodiment, is in the form of functions in the C language. Further, in a method embodiment, a call to a clone of a function is provided, and information mapping the clone to the function is generated. At link time, if no function body of the clone is accessible by a linker, then the linker uses information mapping the clone to the function to satisfy a linker's requirement. At load time, if no function body of the clone is accessible by a loader, then the loader, based on the mapping information, allows selection of a body of the function. However, if the body function of the clone is accessible by the loader, then the loader allows selection of the body of the clone.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 shows a function of the application program and its two clones, in accordance with an embodiment;

FIGS. 4A-4D show various embodiments for cloning;

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention. Further, unless specifically specified, terms used in this document have ordinary meaning to those skilled in the art.

Overview

Figure 1:
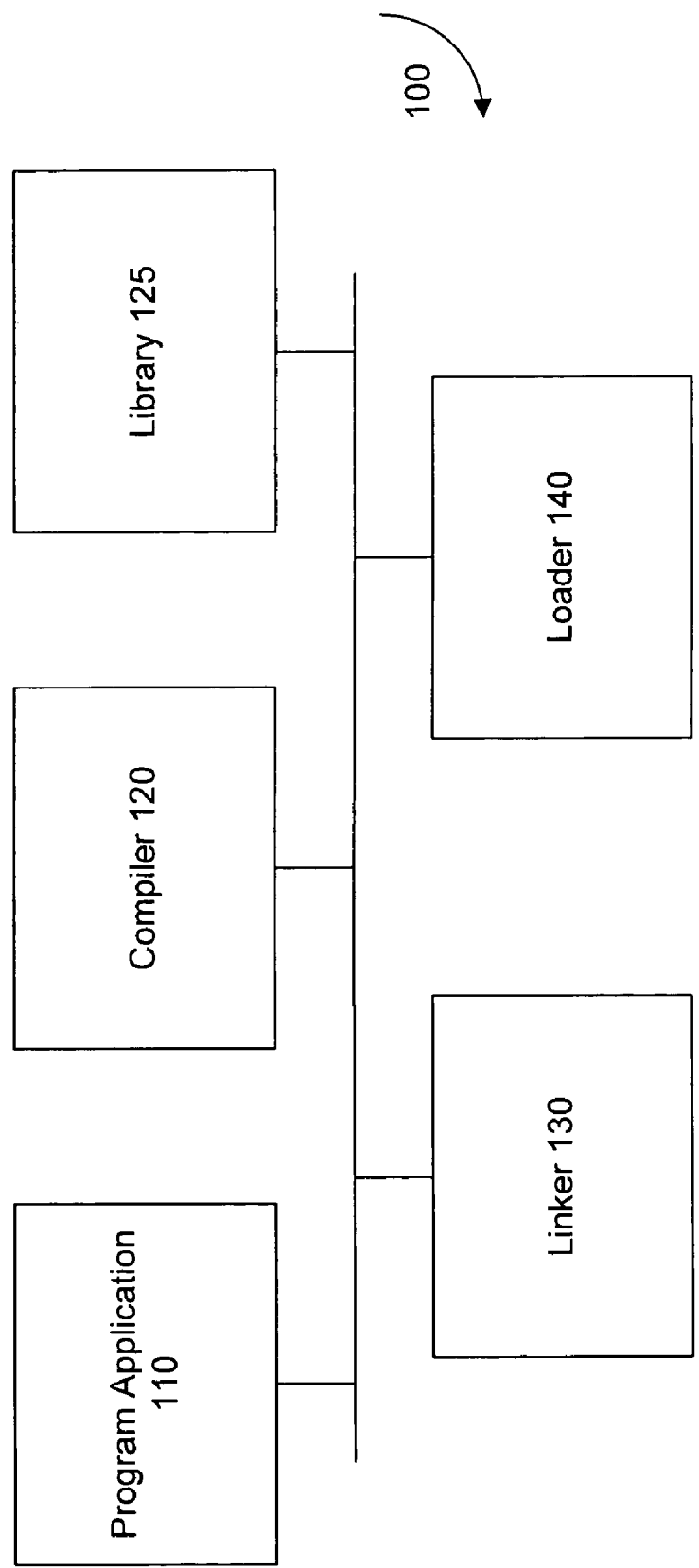
FIG. 1 shows an environment embodiment.

FIG. 1 shows an embodiment of a programming environment 100 that includes an application program 110, a compiler 120, a library 125, a linker 130, and a loader 140. Program 110 performs various computing functionalities on a computer (not shown). Program 110 includes instructions or programming code, which is often in the form of functions in the C language, methods in the Java and C++ language, procedures in the Pascal language, subroutines in the FORTRAN language, etc. For illustration purposes, this document uses the term function. However, embodiments of the invention are applicable to methods, procedures, routines, etc., and their equivalences, and are not limited to a particular programming language. A function is generally a named section of a program including code that performs a task for the program.

Compiler 120 translates source code of programs, such as that of program 110, to object code, object modules, etc.

Library 125 is a collection of precompiled routines, objects, object modules, etc., which are commonly used so that programmers do not have to re-write them when needed. Compiler 120 or various other compilers may provide the content of library 125. A particular program 110 may be linked to one or a plurality of libraries 125.

Linker 130 combines object code, object modules, etc., to form an executable program. These object code, object modules, etc., may be the results of compiling various modules of program 110 and/or be part of one or various libraries 125. Linker 130 may be referred to as an editor linker, a binder, etc.

Loader 140 copies different executable modules of program 110 into memory of a computer for execution. Time at loading may be referred to as load time or run time. In an embodiment, loader 140 is a dynamic loader (dld).

The Application Program

Figure 2:
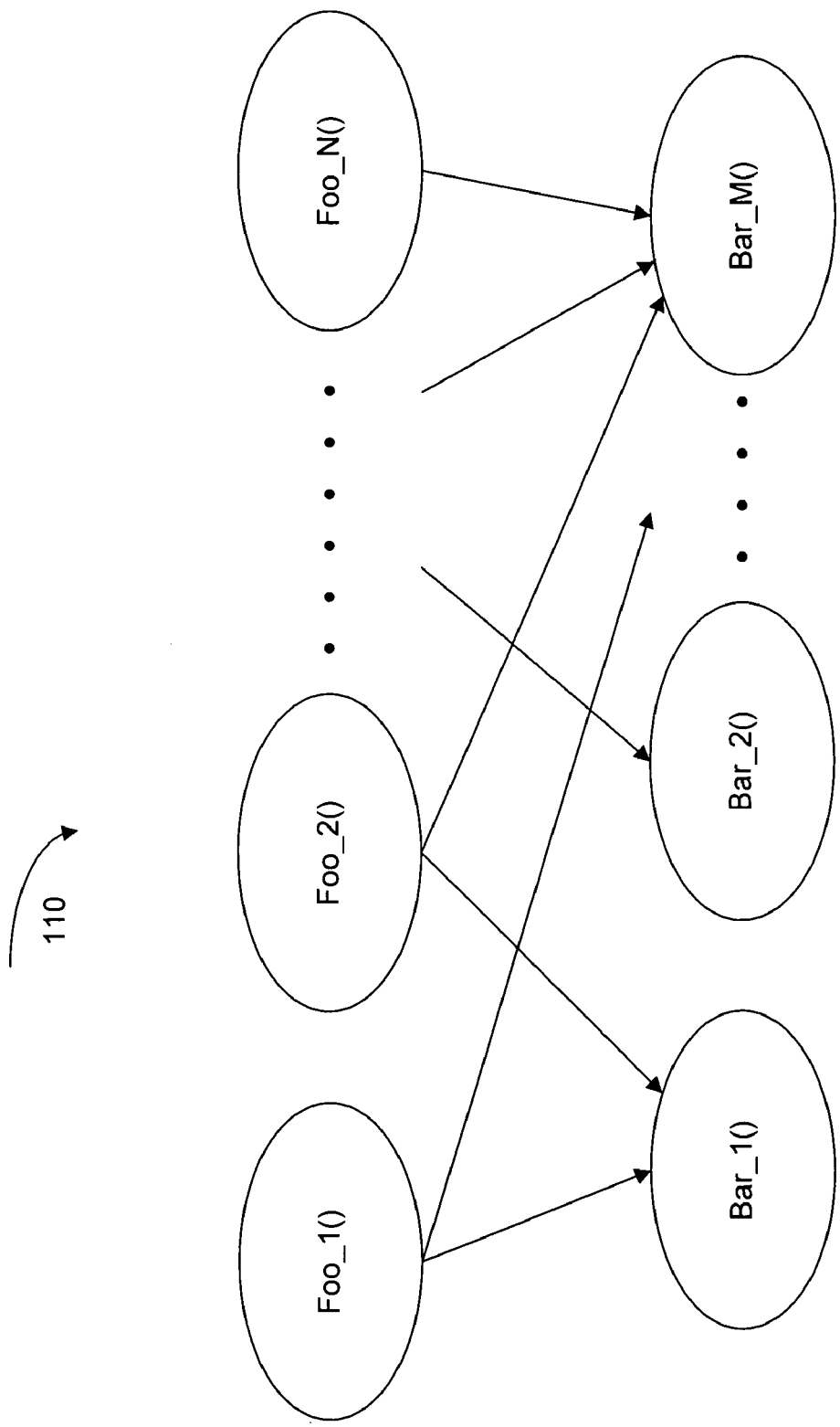
FIG. 2 shows the application program in FIG. 1, in accordance with an embodiment.

FIG. 2 shows an embodiment of program 110 that includes a plurality of functions foo_1( ) to foo_N( ) and a plurality of functions bar_1( ) to bar_M( ). The number "N" and "M" indicate that the number of functions foo( ) and function bar( ) are independent. Functions foo( ) and function bar( ) represent programming functions. For illustration purposes, a function foo( ) calls one or a plurality of functions bar( ). As such, functions foo( ) may be referred to as the callers while functions bar( ) may be referred to as the callees. The code in functions foo( ) that invokes a function bar( ) may be referred to as a call site to function bar( ). However, embodiments of the invention are not limited to this example as functions bar( ) may be called by various other programming code including those in program 110.

Cloning

In accordance with techniques of the invention, one or various versions of a function bar( ) are created or "cloned." For example, a function bar_1( ) may be cloned to one or a plurality of function bar_1_clone_1( ), function bar_1_clone_2( ), function bar_1_clone_3( ), etc., (not shown). Similarly, a function bar_2( ) may be cloned to one or a plurality of a function bar_2_clone_1( ), bar_2_clone_2( ), bar_2_clone_3( ),etc,(not shown). Embodiments of the invention are not limited to the number of clones a function may have. Once cloned versions of functions bar( ) are created, they are treated as programming functions, and, in various embodiments, are included in one or a plurality of libraries 125 to be used as appropriate, such as, by program 110, functions foo( ), other programming code, etc.

Generally, a cloned version of a function bar( ), for example, function bar_clone( ), is more efficient than its original function bar( ). FIG. 3 shows a function bar( ) and its two clones, e.g., function bar_clone_1( ) and a function bar_clone_2( ), to illustrate how functions bar_clone_1( ) and bar_clone_2( ) are more efficient than function bar( ). In FIG. 3, the argument list of function bar( ) includes a passing parameter p as an integer, and the body of function bar( ) includes the statement "if" and its corresponding programming code from lines 310 to 340. Accordingly, if (p==0), then the code from lines 310 to 320 are executed, and if (p!=0), then the code from lines 330 to 340 are executed. In this example of FIG. 3, function bar_clone_1( ) is created for use when (p==0), and, consequently, includes only the code from lines 310 to 320. The code from lines 330 to 340 is eliminated in function bar_clone_1( ) because lines 330 to 340 are not executed when (p==0). Similarly, function bar_clone_2( ) is created for use when (p!=0), and the code from lines 310 to 320 in function bar( ) is therefore eliminated in function bar_clone_2( ) because lines 310 to 320 are not executed when (p!=0). In this example, functions bar_clone_1( ) and bar_clone_2( ) are more efficient than function bar( ) because they have code size smaller than that of function bar( ). In various embodiments, compiler 120 performs program analysis on potential functions bar( ) to be cloned, analyzes the advantages and disadvantages of cloning, and creates the clones if the advantages outweigh the disadvantages. Compiler 120 examines the functions' code, relates their relationships with formal parameters, and from the relationship decides the cloning strategy such as providing the number of clones, the clones that meet a condition, etc. Examples of examined statements and expressions include control flow conditions, array bound calculations, etc. Examples of cloning advantages include reducing the code size, managing memory efficiently, allowing compiler 120 to freely allocate resources without limitations if those limitations are not executed, etc. In general, accessing memory for data takes longer than accessing another storage media such as cache, registers, register files, etc. Examples of cloning disadvantages include the total number of clones per function, per library, large storage space and longer loading time for large libraries, etc. The more clones a library 125 has, the larger the library is, and thus the more memory it occupies, the longer linking and loading time, etc.

Depending on the type and number of arguments that are passed from a caller function foo( ) to a callee function bar( ), one or a plurality of the callee's clones may be created for use as appropriate, and therefore improving performance of program 110. For example, cloning may be done based on the relationship between two or more parameters, the values of one or more parameters, opportunities for compiler 120 to maximize its ability, e.g., freely to allocate resources at its own choice. For example, if compiler 120 is informed that there won't be alias between two parameters, compiler 120 can freely manage data to be used by those parameters and related code without being concerned that the two parameters may be aliased, etc. As a result, the compiled code executes more efficiently. Additional examples of cloning opportunities include two or more parameters are not aliased; pointer parameters have specified alignments wherein the alignment for each pointer parameter may be the same or different; a parameter has a logical relationship with a number, another parameter; a parameter has values in a restricted range, is negative, positive, etc. Examples of logical relationships include greater than, equal to, lesser than, greater or equal to, lesser or equal to, etc.

Compiler 120 also uses profile data of program 110, weighs the advantages and disadvantages, and determines clone candidates and strategies, such as above. Tools to analyze programs may be used to capture behavior of the program, and cloning is done based on such behavior. For example, if the call data to function bar (int p, int q) shows that in the majority of the call p>q, p>0, q=2, etc., then cloning based on p>q, p>0, q=2, etc., is a good opportunity.

In various embodiments, programmers, instead of compiler 120, perform the analysis and specify conditions for compiler 120 to clone a function bar( ) when compiler 120 recognize the directive "#pragma clone" and associated parameters indicating conditions for cloning. These embodiments may be referred to as "user directed" because the users or programmers direct the compiler to perform cloning.

Generally, once the clones are created, invoking these clones is transparent to programmers. For example, if function bar_clone( ) is cloned from function bar( ), then compiler 120 substitutes the code invoking function bar( ) to the code invoking function bar_clone( ). As a result, when the program executes, it automatically invokes function bar_clone( ), instead of function bar( ). Further, compiler 120 also generates and stores information mapping function bar_clone( ) to function bar( ). In an embodiment, mapping information includes a pointer from a clone, e.g., function bar_clone( ) to its original function, e.g., function bar( ), and is provided in the annotation section of the object file of program 110. However, embodiments of the invention are not so limited, such information may be a table having each clone entry corresponding to its original function and/or included in various other places accessible to the linker such as auxiliary objects, etc. In general, each object file of a program contains a set of standard sections such as a "text" section that contains the code, a "data" section that contains the program data, a "symbol table" section that contains the program symbols, etc. Each section has a known "section type" defined by the standard. However, compilers, such as compiler 120, may also create, in the object file of the program, sections that are not defined by the standard in order to pass additional information from the compiler to the linker. Usually, such information includes annotations to some standard entities such as symbols, and the section containing such information may be referred to as an annotation section and may contain various data types.

Various embodiments of the invention clone functions bar( ) so that the object code of function bar( ) and of its clone(s) are included in a library 125. Consequently, building a library 125 may be done independent of building program 110, and cloning may be referred to as cloning at library build time. At that time, the compiler(s), such as compiler 120, that compiles the source code of a library 125 does not see the code that invokes these functions bar( ) or their clones. Further, cloning in accordance with techniques of the invention does not rely on the calling site, the calling code, the calling environment, etc., and are therefore advantageous over other approaches. Because libraries 125 can be built independently from program 110, libraries 125 and/or function clones may be modified and/or updated as appropriate. For example, at the time of building program 110, a library 125 is at version 1.0, which does not include a body of function bar_clone( ). However, cloning process may begin, e.g., compiler 120 can replace calls to function bar( ) by calls to function bar_clone( ) in program 110, and program 110 can be built or, in fact, re-built. Library 125 may then be independently updated to become version 2.0 and includes a body of function bar_clone( ). Nevertheless, at run time, the function body of bar_clone( ) in the version 2.0 of library 125 may be invoked.

Examples of Cloning

FIG. 4A shows an embodiment of cloning a function bar( ) for use when two parameters are not aliased, e.g., point to locations that are not overlapped. Because p and q are not overlapped, compiler 120 can freely schedules tasks without being concerned that p and q may be aliased, and therefore the code from lines 410A to 420A in the clone can be executed more efficiently.

FIG. 4B shows an embodiment of cloning a function bar( ) for use when two parameters have a 16-byte alignment. Because of the alignment, more efficient memory code can be generated from lines 410B to 420B.

FIG. 4C shows an embodiment of cloning a function bar( ) for use when the second parameter is not equal to a defined number, e.g., 1. Accordingly, the code from lines 410C to 420C is eliminated in the clone.

FIG. 4D shows an embodiment of cloning a function bar( ) for use when there is a relationship between the first parameter and the second parameter, such as when the first parameter is greater than the second parameter. Consequently, the code from lines 410D and 420D is eliminated in the clone.

Naming Convention

Figure 5:
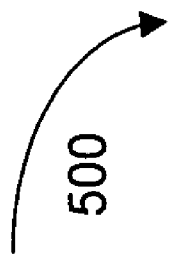
FIG. 5 shows a name for a clone, in accordance with an embodiment.

In various embodiments, clone names are used based on a convention, and a clone name includes encoded conditions for cloning. FIG. 5 shows a name 500, in accordance with an embodiment. In name 500, <clone> indicate the function is a clone, <original_function_name> indicates the name of the original function to be cloned; <condition_1> to <condition_n> indicate various conditions for cloning. Further, the character "_" is used as separations for easily reading a name. However, embodiments of the invention are not limited to this character. No character and/or various other characters may be used. As an example, in the name _clone_bar_parm_align_1_16_parm_value_2_gt_0, "bar" is the original function name with the first parameter having 16-byte alignment, and the second parameter is greater than zero. As another example, _clone_bar_firstparm_gt_secondparm is the name of the clone for function bar( ) having one condition that the first parameter is greater than the second parameter. Based on the name of a clone, the function from which the clone is created and the condition for cloning may be decoded and thus identified. Those skilled in the art will recognize that how a name is decoded is based on how it is encoded.

Support for Cloning at Link Time

In various embodiments, linking is considered satisfactory, and linker 130 does not report errors even if the bodies of function clones including programming code are not yet available or being accessible by the callers, such as being included in a library 125. Accordingly, compiler 120 passes information mapping the clones to their original function to linker 130 so that when linker 130 receives this mapping information, linker 130 recognizes that the body of the clones will be provided as appropriate, e.g., at load time, and thus satisfies the linker's requirement of having a function body of the clone for the call to the clone. After processing the mapping section, symbols for function clones are marked with a flag so that linker 130 does not report "unsatisfied symbols." Reporting an "unsatisfied" condition normally occurs when there is not a function body at link time to satisfy the call to the function. In an embodiment, if there is no function body of the clone, linker 130 generates a temporary "unsatisfied" condition and resorts to the mapping information. If the mapping information is appropriate, then linking is considered satisfactory, and linker 130 does not report an unsatisfied condition. For example, if function bar_clone( ) is mapped to function bar( ), and the body of function bar( ) is included in the library, then linking is satisfactory and linker 130 does not report an unsatisfied condition. However, if the body of both function bar_clone( ) and function bar( ) is not accessible, e.g., not included in library 125, then linker 130 reports the unsatisfied condition.

Linker 130 also uses the mapping section to create entries in the loadable note section in the executable that contains information allowing loader 140 to perform alternate symbol resolution for cloned functions. In an embodiment, when loader 140 resolves a reference, e.g., a call to a clone, and if the clone body exists, then the reference is resolved to the clone. However, if the clone body does not exist, then the reference is resolved to the original function of the clone. In order for loader 140 to find the original function of the clone, loader 140 also uses information mapping the clone to the original function, which, in an embodiment, is stored in the note section or "loadable" note section. The term "loadable" is commonly used in the art because the note section is used by the loader. The loadable note section may also be referred to as an annotation section as described above. Linker 130 also creates an import procedure linkage table entry (IPLT) for the cloned functions in the executable so that the resolution for the cloned functions may be delayed until load time. Generally, a procedure linkage table entry (PLT), which may be referred to as a function descriptor, is an entry describing the function. A PLT also contains the code address of the function and the data segment address of the shared library that defines the function. A PLT is normally used for calls to a function defined in a shared library, e.g., library 125, and this PLT may be referred to as an imported PLT or IPLT.

Support for Cloning at Load Time

In an embodiment, at load time, if loader 140 recognizes the definition, e.g., the body, of the cloned functions, e.g., functions bar_clone( ), then loader 140 resolves references to the cloned functions to this definition, e.g., function bar_clone( ), and program execution therefore executes the code of this function body. However, if there is no definition, then loader 140 resolves the clone references to the definition of the original function, e.g., function bar( ). In an embodiment, if loader 140 cannot access the body of function bar_clone( ), then loader 140 uses the loadable note section in the executable that contains entries with clone information created by linker 130. Each entry in the note section includes information mapping a clone function to its original function. If the mapping information is appropriate, then loading is complete without error messages.

To avoid unnecessary routing for actual unsatisfied symbols, a symbol type or attribute for the symbol table is provided to mark symbols/functions that are clones. When resolving clone functions, loader 140 uses this table, recognizes cloned functions, and acts accordingly.

In various embodiments, when there is more than one clone for a function, loader 140 prioritizes the list of the clones and selects from the list the best, the next-to-best clone, etc., to be used. In general, a less generalized, i.e., more restrictive, clone is better than a more generalized clone; a clone is better than its original function, etc. For example, if there is a reference to a clone with two conditions, and the body for this clone does not exist. However, if the body of a clone that satisfies one condition exists, then the reference is resolved to that less restrictive clone, i.e., the one with one condition, instead of the original function.

Illustration of a Method Embodiment

Figure 6:
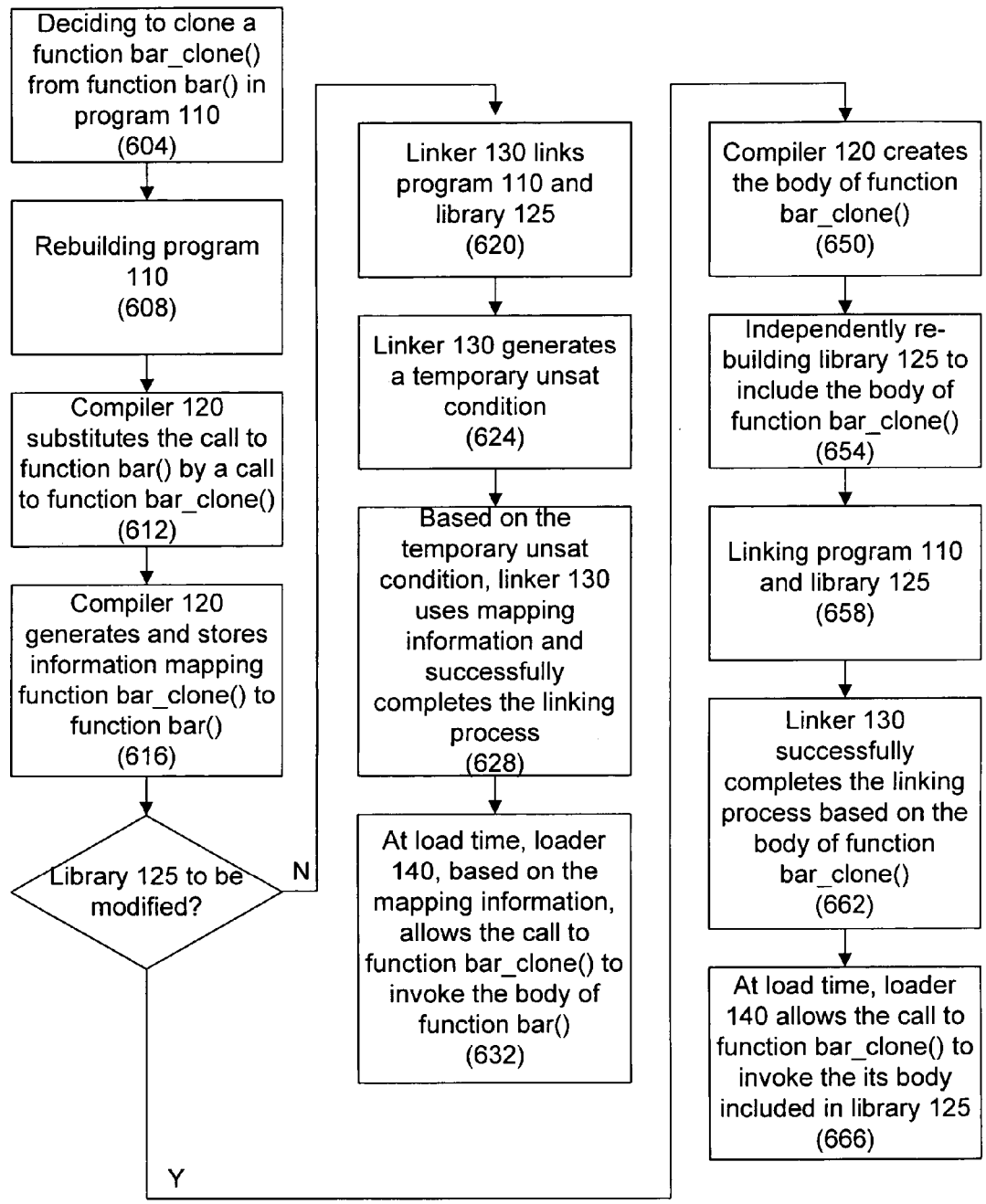
FIG. 6 is a flowchart illustrating a method embodiment.

FIG. 6 is a flowchart illustrating a method embodiment of the invention. For illustration purposes, program 110 includes a call to a function bar( ). Program 110 has been in operation and operates with library 125.

In step 604, a decision is made to clone a function bar_clone( ) from function bar( ). The decision was the result of one or a combination various techniques described above, such as reviewing the parameters passed to function bar( ), analyzing the advantages and disadvantages of cloning, etc. At this point, library 125 does not include a body of function bar_clone( ).

In step 608, program 110 is (re-)built, including (re-)compiling and (re-)linking with library 125. As explained above, this building of program 110, in various embodiments, is independent of building library 125.

In step 612, compiler 120, as part of the building process, compiles program 110 and thus substitutes the call to function bar( ) by a call to function bar_clone( ).

In step 616, compiler 120 generates and stores information mapping function bar_clone( ) to function bar( ).

For illustration purposes, if program 110 continues to use library 125 without modification, then the method continues from steps 620 to 632. However, if library 125 is modified to include the body of function bar_clone( ), then the method continues from steps 650 to 666.

In step 620, linker 130, also as part of the rebuilding process, links various modules and/or portions of program 110 and library 125.

In step 624, linker 130 generates a temporary unsatisfied condition because linker 130 has no access to the body of function bar_clone( ).

In step 628, because of the temporary unsatisfied condition related to function bar_clone( ), linker 130 uses the information mapping function bar_clone( ) to function bar( ). For illustration purposes, linker 130, based on the mapping information, recognizes the body of function bar( ) and consequently considers the linking process satisfactory. As a result, linker 130 does not generate an unsatisfied condition, and linking and thus building program 110 is complete.

In step 632, program 110 is loaded for execution. Because there is not a body of function bar_clone( ), loader 140, based on the information mapping function bar_clone( ) to function bar( ), allows the call to function bar_clone( ) in step 612 to invoke the body of function bar( ). Execution of program 110 continues as normal.

The following steps 650 to 666 illustrate the situation in which the body of function bar_clone( ) is created and included in library 125, and the method continues after step 616.

In step 650, for illustration purposes, a body of function bar_clone( ) is created to be included in library 125. Compiler 120 may create this body of function bar_clone( ) automatically or by a directive "pragma" statement as illustrated above.

In step 654, after function bar_clone( ) is created, library 125 is (re-)built to include the body of function bar_clone( ). Re-building library 125 in this step may be done independently from re-building/building program 110.

In step 658, linking library 125 and program 110 is performed.

In step 662, linker 130 processes the linking without complication because the call to function bar_clone( ) in step 612 is satisfied by the body of function bar_clone( ) included in library 125 in step 654.

In step 666, at load time, loader 140, recognizing the call to function bar_clone( ) and its body in library 125, allows the call to invoke this body, and execution of program 110 continues as normal.

In steps 662 and 666, both linker 130 and loader 140 do not use information mapping function bar_clone( ) to function bar( ) because the body of function bar_clone( ) included in library 125 in step 654 satisfies the call to function bar_clone( ) in step 612.

Various embodiments of the invention are advantageous over other approaches because analysis on the callers is not necessary, and cloning may thus be done with assumptions without regards to the function callers. Compiler 120 does not have to process the source code of program application 110 and of library 125 at the same time, i.e., independently from one another. As a result, compiler 120 can substitute calls to functions to be clones to calls to the clones in program 110 without seeing the source code of library 125.

Computer System Overview

Figure 7:
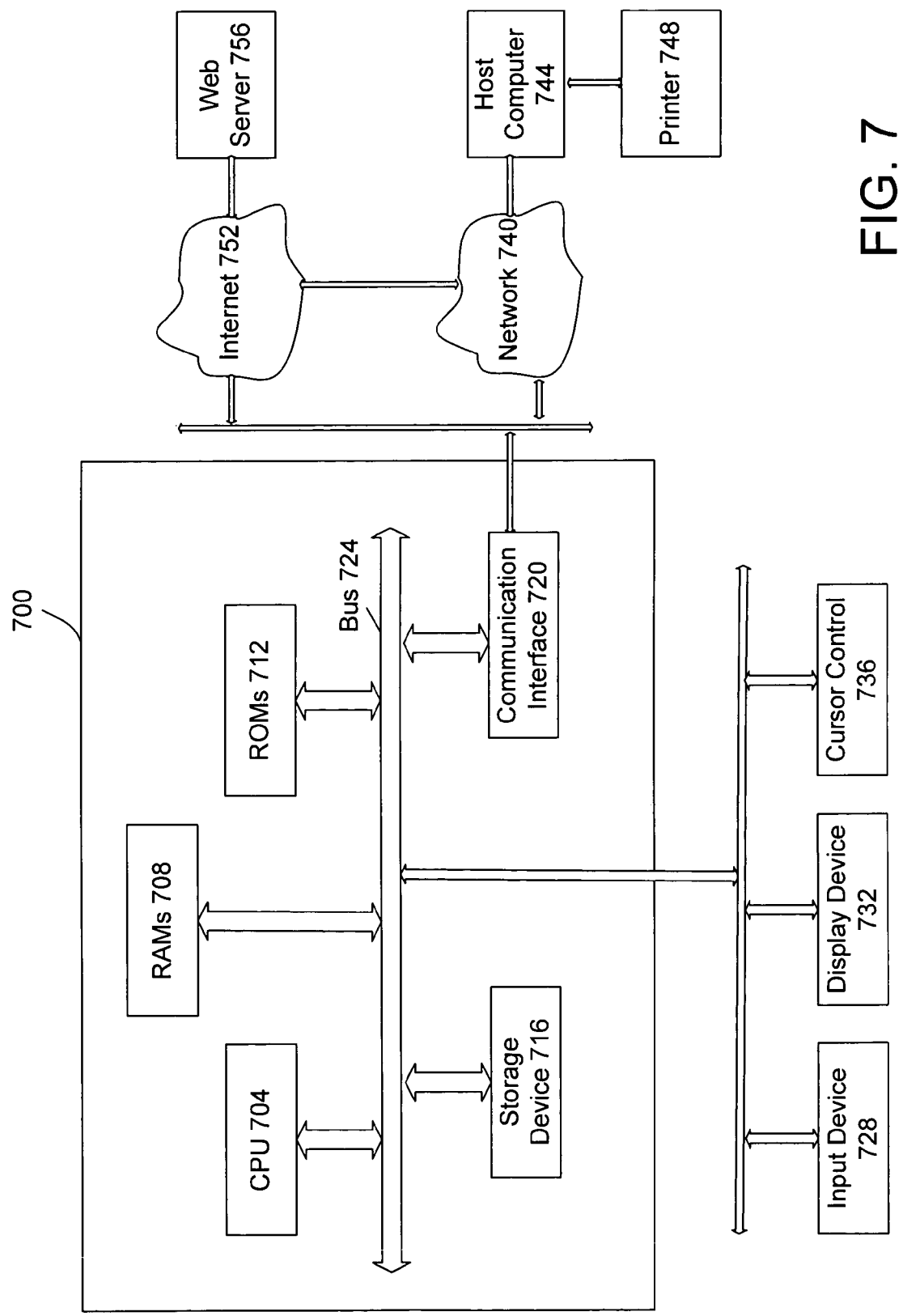
FIG. 7 shows a computer in accordance with an embodiment.

FIG. 7 is a block diagram showing a computer system 700 upon which embodiments of the invention may be implemented. For example, computer system 700 may be implemented to run environment 100, to perform tasks in the form of programming code or instructions, in accordance with the techniques described above, etc. In an embodiment, computer system 700 includes a central processing unit (CPU) 704, random access memories (RAMs) 708, read-only memories (ROMs) 712, a storage device 716, and a communication interface 720, all of which are connected to a bus 724.

CPU 704 controls logic, processes information, and coordinates activities within computer system 700. In an embodiment, CPU 704 executes instructions stored in RAMs 708 and ROMs 712, by, for example, coordinating the movement of data from input device 728 to display device 732. CPU 704 may include one or a plurality of processors.

RAMs 708, usually being referred to as main memory, temporarily store information and instructions to be executed by CPU 704. Information in RAMs 708 may be obtained from input device 728 or generated by CPU 704 as part of the algorithmic processes required by the instructions that are executed by CPU 704.

ROMs 712 store information and instructions that, once written in a ROM chip, are read-only and are not modified or removed. In an embodiment, ROMs 712 store commands for configurations and initial operations of computer system 700.

Storage device 716, such as floppy disks, disk drives, or tape drives, durably stores information for use by computer system 700.

Communication interface 720 enables computer system 700 to interface with other computers or devices. Communication interface 720 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 720 may also allow wireless communications.

Bus 724 can be any communication mechanism for communicating information for use by computer system 700. In the example of FIG. 7, bus 724 is a media for transferring data between CPU 704, RAMs 708, ROMs 712, storage device 716, communication interface 720, etc.

Computer system 700 is typically coupled to an input device 728, a display device 732, and a cursor control 736. Input device 728, such as a keyboard including alphanumeric and other keys, communicates information and commands to CPU 704. Display device 732, such as a cathode ray tube (CRT), displays information to users of computer system 700. Cursor control 736, such as a mouse, a trackball, or cursor direction keys, communicates direction information and commands to CPU 704 and controls cursor movement on display device 732.

Computer system 700 may communicate with other computers or devices through one or more networks. For example, computer system 700, using communication interface 720, communicates through a network 740 to another computer 744 connected to a printer 748, or through the world wide web 752 to a server 756. The world wide web 752 is commonly referred to as the "Internet." Alternatively, computer system 700 may access the Internet 752 via network 740.

Computer system 700 may be used to implement the techniques described above. In various embodiments, CPU 704 performs the steps of the techniques by executing instructions brought to RAMs 708. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 704 may be stored in and/or carried through one or more computer-readable media, which refer to any medium from which a computer reads information. Computer-readable media may be, for example, (i) any magnetic medium, including a floppy disk, a hard disk, a zip-drive cartridge, a magnetic tape, (ii) any optical medium, including a CD-ROM, a CD-RAM, a DVD-ROM, a DVD-RAM, (iii) any physical medium having computer-readable patterns of holes, including paper-tape, punch-cards, (iv) any memory chin or cartridge, including a RAM, a ROM, an EPROM. Computer-readable media may also be coaxial cables, copper wire, fiber optics, capacitive or inductive coupling, etc. As an example, the instructions to be executed by CPU 704 are in the form of one or more software programs and are initially stored in a CD-ROM being interfaced with computer system 700 via bus 724. Computer system 700 loads these instructions in RAMs 708, executes some instructions, and sends some instructions via communication interface 720, a modem, and a telephone line to a network, e.g. network 740, the Internet 752, etc. A remote computer, receiving data through a network cable, executes the received instructions and sends the data to computer system 700 to be stored in storage device 716.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for improving performance of a program, comprising:
   providing a call to a clone of a function from which the clone is created, wherein said call is provided regardless of whether a function body of the clone exists or not;
   the function representing programming code performing a task for the program;
   generating information mapping the clone to the function;
   at link time for the program, if no function body of the clone is accessible by a linker, then the linker using the information mapping the clone to the function to satisfy a linker's requirement; and
   at load time for the program, if no function body of the clone is accessible by a loader, then the loader, based on the information mapping the clone to the function, resolving a function reference to a body of the function; and if the body of the clone is accessible by the loader, then the loader resolving the function reference to the body of the clone.

2. The method of claim 1 wherein a call to the function is substituted by the call to the clone of the function.

3. The method of claim 2 wherein a compiler substitutes the call to the function by the call to the clone of the function.

4. The method of claim 1 wherein the mapping information is included in an annotation section of an object of the program.

5. The method of claim 1 wherein a compiler generates the mapping information.

6. The method of claim 1 wherein the mapping information is stored in a loadable note section for use by the loader.

7. The method of claim 1 wherein the function body of the clone for use by the call to that clone is selected from a list of bodies based on a priority.

8. The method of claim 1 wherein the function has more than one clone in the program.

9. The method of claim 1 wherein the clone is associated with a flag identifying the clone as a function clone.

10. The method of claim 1 wherein symbol resolution of the clone is delayed to the load time for the program based on a linkage entry provided by the linker.

11. The method of claim 1 wherein a name representing the clone includes one or a combination of a condition for cloning and a name representing the function.

12. The method of claim 1 wherein the function body of the clone is included, independently of the provision of said call in said program, in a library for use by the program.

13. The method of claim 1 wherein a compiler creates the function body of the clone based on a programming statement provided to the compiler.

14. The method of claim 1 wherein a compiler creates the function body of the clone after an analysis determining advantages and disadvantages of such creation.

15. The method of claim 1 wherein the clone is created based on one or a combination of:
   a logical relationship between at least two parameters passed to the function;
   an alias-relationship between at least two parameters passed to the function;
   a value of at least one parameter passed to the function from; and
   a number of alignment bytes of at least one parameter passed to the function.

16. The method of claim 1 wherein the clone is created based on profile data of the function.

17. A method for using a clone cloned from a function in a program, comprising:
   satisfying a linker's requirement of having a clone body for a call to the clone, regardless of whether the clone body exists or not, by using information mapping the clone to the function;
   the linker's requirement being part of building the program; and
   building a library that includes the body of the clone;
   wherein the function represents programming code performing a task for the program and building the program and the library are independent of one another.

18. The method of claim 17, prior to building the library that includes the body of the clone, comprising using a library that includes a body of the function but does not include the body of the clone with the program that includes the call to the clone.

19. The method of claim 17 wherein the call to the clone has replaced a call to the function.

20. The method of claim 17 wherein the clone is created based on information passed to the function.

21. A method for using a clone cloned from a section of code of a program, comprising:
   substituting a call to the section of the code by a call to the clone regardless of whether a body of the clone exists or not;
   at link time for the program, mapping the clone to the section of code;
   at load time for the program, mapping the clone to the section of code; and
   during execution of the program, if the body of the clone is available in a library used by the program, then using that body, else if the body of the clone is not available in the library, then using the section of code from which the clone is cloned.

22. The method of claim 21 being implemented as program instructions stored in a computer-readable medium.

23. A system of programmed hardware and/or hard-wired circuitry for using a clone cloned from a function in a program, comprising:
   means for mapping the clone to the function to satisfy a linking requirement of having a clone body for a call to the clone regardless of whether the clone body exists or not;
   the linking requirement being part of building the program; and
   means for building a library that includes the body of the clone;
   wherein the function represents programming code performing a task for the program, and building the program and the library are independent of one another.

24. The system of claim 23 wherein the clone is created based on information passed to the function.

25. A computer-readable medium embodying instructions for causing, when executed by a computer, the computer to perform a method for improving performance of a program, the method comprising:
   providing a call to a clone of a function from which the clone is created, wherein said call is provided regardless of whether a function body of the clone exists or not;
   the function representing programming code performing a task for the program;
   generating information mapping the clone to the function;
   creating the clone based on one or a combination of
      a logical relationship between at least two parameters passed to the function;
      an alias-relationship between at least two parameters passed to the function;
      a value of at least one parameter passed to the function from; and
      a number of alignment bytes of at least one parameter passed to the function;
   at link time for the program, if no function body of the clone is accessible by a linker, then the linker using the information mapping the clone to the function to satisfy a linker's requirement; and
   at load time for the program, if no function body of the clone is accessible by a loader, then the loader, based on the information mapping the clone to the function, resolving a function reference to a body of the function; and if the body of the clone is accessible by the loader, then the loader resolving a function reference to the body of the clone.

26. The computer-readable medium of claim 25 wherein the program includes multiple calls to multiple clones of the function.

* * * * *

UNITED STATES PATENT AND TRADEMARK OFFICE
CERTIFICATE OF CORRECTION

PATENT NO. : 7,401,330 B2  Page 1 of 1
APPLICATION NO. : 10/734551
DATED : July 15, 2008
INVENTOR(S) : David Xinliang Li et al.

It is certified that error appears in the above-identified patent and that said Letters Patent is hereby corrected as shown below:

In column 4, line 33, delete "q=2" and insert -- q==2 --, therefor.

In column 4, line 34, delete "q=2" and insert -- q==2 --, therefor.

In column 9, line 64, delete "chin" and insert -- chip --, therefor.

Signed and Sealed this

Twenty-first Day of October, 2008

JON W. DUDAS
*Director of the United States Patent and Trademark Office*